T. A. BREWSTER.
STREET CAR TRUCK.
APPLICATION FILED SEPT. 2, 1919.

1,345,528.

Patented July 6, 1920.
5 SHEETS—SHEET 1.

Inventor:
Theodore A. Brewster.
By,
Fredk J. Karson,
Attorney.

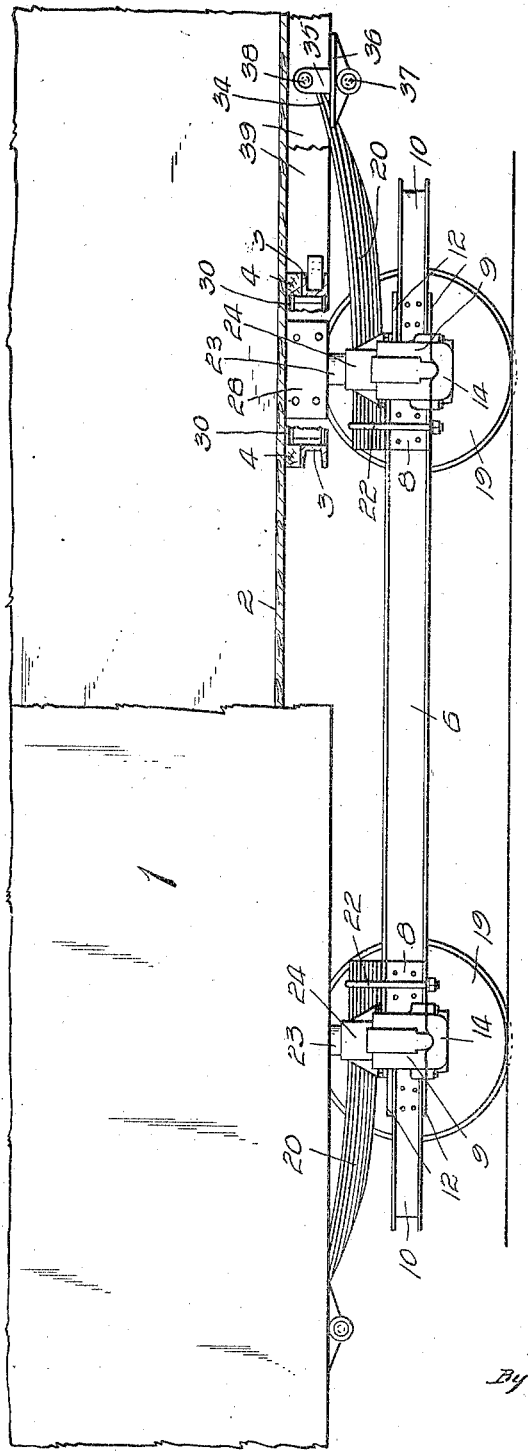

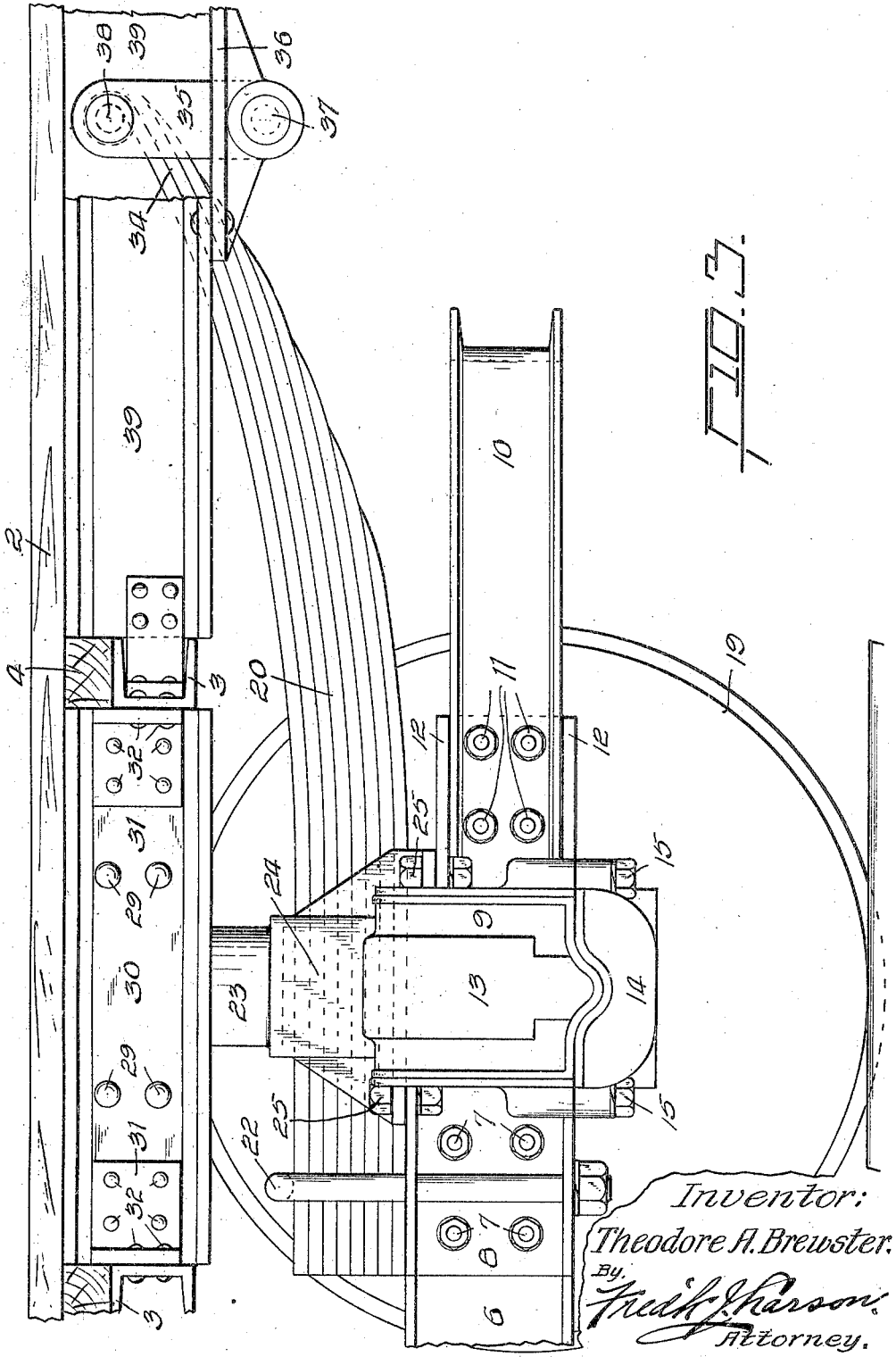

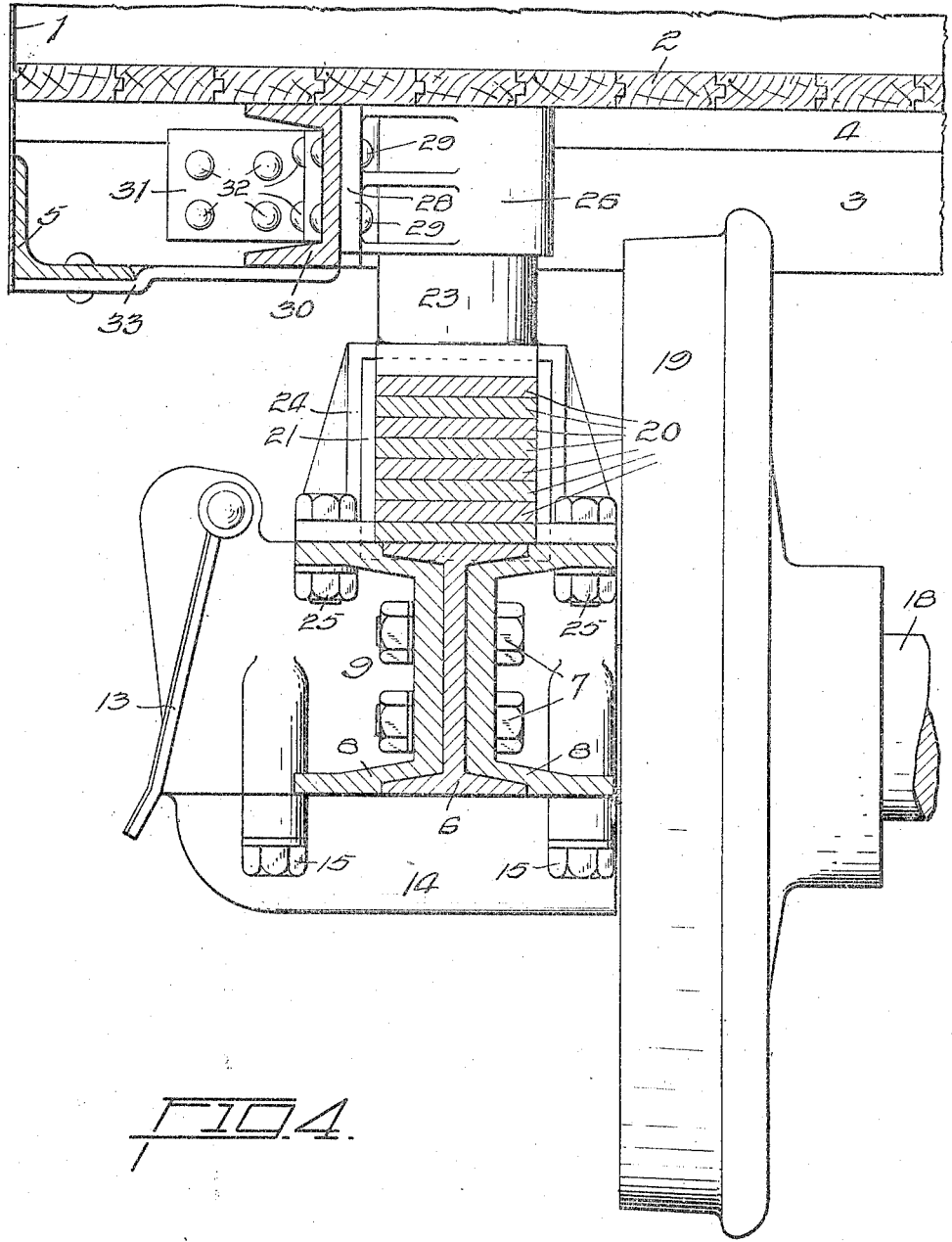

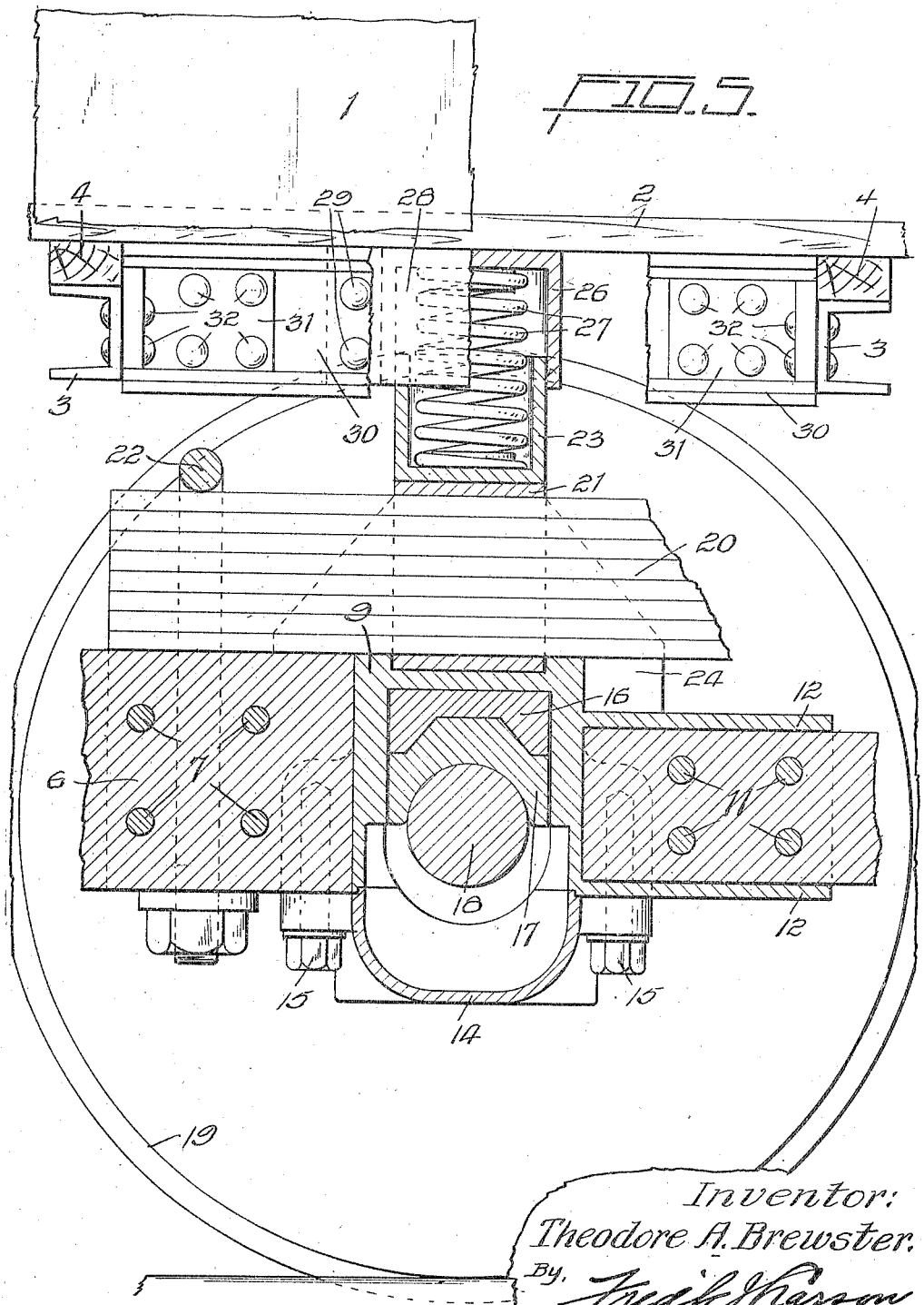

UNITED STATES PATENT OFFICE.

THEODORE A. BREWSTER, OF ST. LOUIS, MISSOURI.

STREET-CAR TRUCK.

1,345,528.     Specification of Letters Patent.     Patented July 6, 1920.

Application filed September 2, 1919. Serial No. 321,011.

*To all whom it may concern:*

Be it known that I, THEODORE A. BREWSTER, a citizen of the United States, residing in the city of St. Louis and State of Missouri, have invented certain new and useful Improvements in Street-Car Trucks, of which the following is a specification.

This invention relates to street car trucks, and more particularly to the type of truck used under short length cars, generally known as the single truck type and is a distinct and practical improvement to overcome certain important practical objections to, and defects in, trucks of the above type.

It is a well known fact, that when a single truck car of the present type is being propelled around a curve, a serious stress is set up into the springs due to the car body attempting to continue along in a straight line, and as a result of this tendency the car body actually does continue along in this straight line until the truck is part way along the curve. In the meantime the stress is increasing until the car body finally yields and then it moves swiftly toward the center line of the curved track, but the force now is so great that the body continues too far and a stress is again set up in the opposite direction thus a swaying motion is set up which is very annoying to passengers, and has resulted in injury to the passengers and broken springs.

It is an object of my present invention to provide a street car truck which will eliminate the above and other objections which are a source of annoyance in most of the trucks now in service under the small type of cars, generally known as the single truck type.

A further object of my invention is to provide a truck with telescopic driving means which also serve as auxiliary spring housings and overcomes the objections previously mentioned by holding the center line of a car body, at all times, directly over the center line of the truck, and, at the same time, permitting the quarter elliptic springs, I employ, to function, as intended, in an up and down movement.

A still further object of the invention is to fix the driving means to the truck frame, preferably the journal boxes thereof, to establish a positive four point drive remote from the springs employed.

With the above and other objects in view, the invention consists in certain novel features of construction, arrangement and combination of parts, described in the following specification and finally pointed out in the claims hereto appended.

Referring to the accompanying drawings forming a part of this specification wherein like characters of reference denote similar parts throughout the several views:

Fig. 2, is a side elevation of a truck positioned under a car, the car being shown as partly broken away.

Fig. 3, is a detail in side elevation of one end of the truck and car under-frame.

Fig. 4, is a detail in sectional elevation of one end of my improved truck.

Fig. 5, is a detail in sectional elevation illustrating the positive driving means between the truck and car under-frame.

Figure 1:
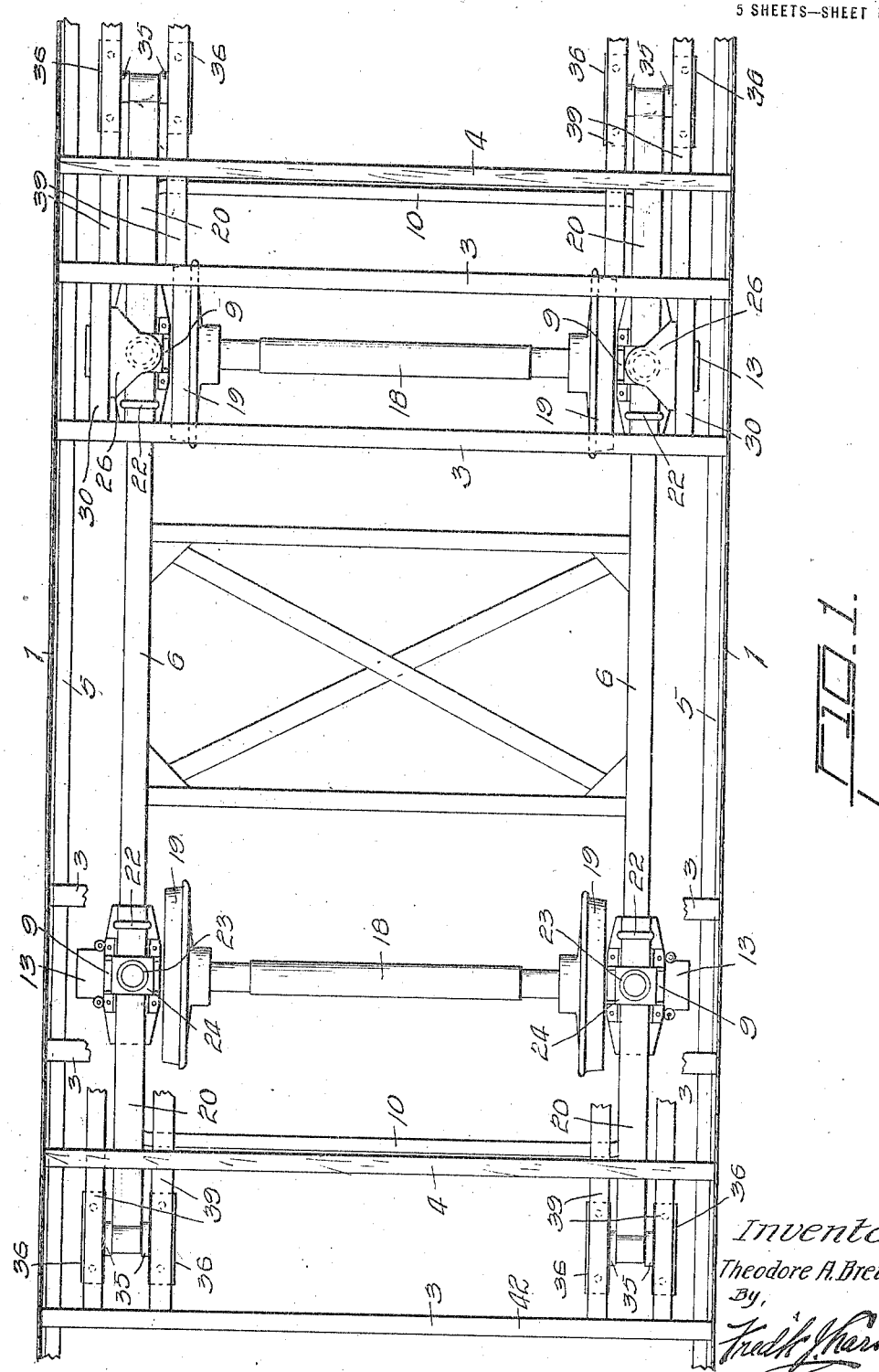
Figure 1, is a top plan view of my improved truck and part of a car frame mounted thereon.

Referring to the drawings, 1 indicates a car body having a floor 2. The floor is mounted upon a plurality of suitably spaced cross-sills 3. The cross-sills are each provided with a wood filler 4 to which the flooring is secured. 5 represents the car body side sill, as clearly shown in Fig. 4.

The truck comprises a pair of suitable side sills 6, such as I-beams, connected by suitable fasteners 7 at each end to the suitably spaced arms 8 formed integral with each journal-box 9 and a pair of suitable channeled end sills 10 which are connected by suitable fasteners 11 to the channeled arms 12 formed integral with each journal-box 9. The journal-box 9 is provided with the usual door 13. The journal-box 9 is further provided with a removable bottom section 14 which is held in position by suitable fastening means 15.

16 indicates a journal wedge. 17 represents a bearing while 18 designates the axle, and 19 a wheel.

20 indicates a suitable quarter elliptic spring arm which is mounted both upon the journal-box and the side sills 6 of the truck frame. The spring 20 is provided with a suitable spring-band 21 above each journal-box 9. The spring 20 is held in position at one end by means of a suitable clip 22.

23 indicates a suitable lower driving arm member, preferably tubular, which is provided with a suitable integral base 24. The driving arm base 24 is preferably, although not necessarily, secured to the journal-box arms 8 and 12 by means of suitable fasteners 25. The base 24 preferably straddles each spring arm 20 to assist in holding the spring arm in position.

A suitable upper driving arm member 26, preferably tubular, is arranged for telescopic connection with the upper end of each lower driving arm member 23. A suitable coiled spring 27 is interposed between the upper driving arm member 26 and the lower driving arm member 23, as clearly shown in Fig. 5. The upper driving arm member 26 is provided with an integral arm 28 which is connected by means of suitable fasteners 29 to a suitable sub-sill 30. The sub-sill 30 is fixed between the cross-sills 3 of the under-frame by means of angle-plates 31 and suitable fasteners 32. A suitable gusset plate 33 is fixed to the body side-sills 3 and the sub-sills 30.

It will be here observed that the lower driving arm members 23, including the bases 24, upper driving arm members 26 and sub-sills 30, provide an absolute and positive drive connection, at four points, between the truck frame and the car body.

The free end 34 of each quarter elliptic spring 20 is provided with a pair of hangers comprising links 35 and supporting bases 36. Each base 36 is pivotally connected to the lower end of the links 35 by means of a pin 37. Each link is also pivotally connected to the free end of the quarter elliptic spring arm 20 by means of the pin 38. A pair of suitable sub-sills 39 are suitably connected at their ends by means of angle plates 40 and fasteners 41 to the cross-sills 3 and 42. The sub-sills 39 are adapted to rest or seat upon the base 36 of the pivotally supported hangers suspended from the free end of each quarter elliptic spring 20, as clearly shown in Figs. 1, 2 and 3. Each hanger base 36 is preferably fixed to its respective sub-sill 39 by any suitable fastening means.

It will be observed that the free ends of the quarter elliptic spring arms 20 are guided in such a manner that side sway is impossible, and at the same time the springs are permitted to move up and down freely, as is manifest.

Each lower driving arm member, being fixed to the truck frame, preferably the journal-boxes thereof, it will be observed that they establish a positive drive connection between the truck frame and car under-frame that will positively eliminate rocking movements either side or end wise, as is manifest.

The driving units, it will be further observed, are preferably so formed and arranged that they will readily adapt themserves for use as auxiliary or buffer spring housings.

It will be observed that the journal-boxes are of unique design and made to combine both strength and neatness of lines and to provide suitable supports for both the side and end sills of the truck frame. It will be noted that the shape of the journal-box arms 8 are such as to be applicable for use with I-beam sills designated 6, which are the best to use as truck sills, due to uniformity with regard to their neutral axis passing through the center lines, both horizontal and vertical. The other journal-box arm designated 12, to which the end sills 10 are connected, and supported, is so shaped as to fit firmly over the channel end sills 12, which provides a substantial attachment for brake hanger brackets and guides for center brake levers.

From the foregoing description, it is evident that I have constructed a truck for cars of the single truck type, which will positively hold the center line of a car body at all times with the center line of the truck due to the fixed four point driving means established between the truck frame and the under-frame of the car, and at the same time permit the quarter elliptic springs 20 to function as intended in an up and down movement, whether rounding curves, or rolling on a straight track.

A truck as herein described is safe, efficient, simple in its construction and will carry passengers with a much greater degree of comfort than trucks of the type now in service.

The many other advantages of a truck as herein described will readily suggest themselves to those skilled in the art to which it appertains.

I do not wish to be understood as having limited myself to the exact details of construction shown and described, but desire to have it understood that the device I have shown in the drawings is merely illustrative, as it is manifest that various minor changes may be made in the form, shape and particular arrangement of parts without departing from the spirit of my invention, hence reserve the right to make any such changes or modifications as may fairly fall within the scope of the appended claims when fairly construed.

What I claim is:

1. In combination with the underframe of a car, a truck, a telescopic four point drive connection between the truck frame and the underframe, and a buffer spring carried by each drive connection.

2. A street car truck comprising a plurality of journal-boxes, side and end truck sills, means integral with journal-boxes for connecting the side and end sills thereto, a quarter elliptic spring supported by each journal-box and the side sills, a telescopic driving arm supported by each journal-box, resilient means carried within each driving arm, means for connecting the driving arms with the underframe of a car, and means carried by the free end of each spring for a part of the underframe of the car to rest upon.

In testimony whereof, I have hereunto signed my name to the specification.

THEODORE A. BREWSTER.